(12) United States Patent
Balassanian

(10) Patent No.: US 7,774,740 B2
(45) Date of Patent: Aug. 10, 2010

(54) APPLICATION SERVER

(75) Inventor: Edward Balassanian, Kirkland, WA (US)

(73) Assignee: Implicit Networks, Inc., Kirkland, WA (US)

( * ) Notice: Subject to any disclaimer, the term of this patent is extended or adjusted under 35 U.S.C. 154(b) by 1136 days.

(21) Appl. No.: 11/241,985

(22) Filed: Oct. 4, 2005

(65) Prior Publication Data

US 2006/0031824 A1    Feb. 9, 2006

Related U.S. Application Data

(63) Continuation of application No. 09/968,704, filed on Oct. 1, 2001, now Pat. No. 6,976,248, which is a continuation of application No. 09/040,972, filed on Mar. 18, 1998, now Pat. No. 6,324,685.

(51) Int. Cl.
   G06F 9/44    (2006.01)
   G06F 9/45    (2006.01)
(52) U.S. Cl. .................. 717/100; 717/140; 717/203
(58) Field of Classification Search ......... 717/100–103, 717/148, 120–121, 140–141; 709/203–204
See application file for complete search history.

(56) References Cited

U.S. PATENT DOCUMENTS

| | | | |
|---|---|---|---|
| 5,706,502 A | | 1/1998 | Foley et al. |
| 5,761,421 A | | 6/1998 | Van Hoff et al. |
| 5,805,829 A | | 9/1998 | Cohen et al. |
| 5,828,840 A | | 10/1998 | Cowan et al. |
| 5,835,712 A | * | 11/1998 | DuFresne ............. 709/203 |
| 5,848,274 A | | 12/1998 | Hambry et al. |
| 5,872,915 A | | 2/1999 | Dykes et al. |
| 5,884,078 A | | 3/1999 | Faustini |
| 5,943,496 A | * | 8/1999 | Li et al. .............. 719/328 |
| 6,230,184 B1 | | 5/2001 | White et al. |
| 6,253,228 B1 | * | 6/2001 | Ferris et al. ........... 709/203 |
| 6,279,151 B1 | * | 8/2001 | Breslau et al. ......... 717/140 |
| 6,282,702 B1 | * | 8/2001 | Ungar .................. 717/148 |
| 6,295,643 B1 | | 9/2001 | Brown et al. |
| 6,317,781 B1 | * | 11/2001 | De Boor et al. ........ 709/217 |

(Continued)

OTHER PUBLICATIONS

Kang et al, "Query type classification for web documents retrieval", ACM SIGIR, pp. 64-71, 2003.*

(Continued)

Primary Examiner—Anil Khatri
(74) Attorney, Agent, or Firm—Gard & Kaslow LLP

(57) ABSTRACT

The present invention is an applet server which accepts requests for applets from client computers. A request specifies the format in which an applet is to be delivered to the requesting client computer. The applet server has a cache which it uses to store applets for distribution to client computers. If the specified form of the requested applet is available in the cache, the applet server transmits the applet to the requesting client. If the applet is not available in the cache, the server will attempt to build the applet from local resources (program code modules and compilers) and transformer programs (verifiers and optimizers). If the applet server is able to build the requested applet, it will then transmit the applet to the requesting client computer. If the applet server is unable to build the requested applet, it will pass the request to another applet server on the network for fulfillment of the request.

40 Claims, 3 Drawing Sheets

U.S. PATENT DOCUMENTS

| | | | |
|---|---|---|---|
| 6,321,377 | B1 | 11/2001 | Beadle et al. |
| 6,324,685 | B1 * | 11/2001 | Balassanian ................. 717/118 |
| 6,327,701 | B2 * | 12/2001 | Ungar ......................... 717/125 |
| 6,330,710 | B1 * | 12/2001 | O'Neil et al. ................ 717/100 |
| 6,336,213 | B1 | 1/2002 | Beadle et al. |
| 6,446,081 | B1 | 9/2002 | Preston |
| 6,594,820 | B1 | 7/2003 | Ungar |
| 6,636,900 | B2 | 10/2003 | Abdelnur |
| 6,643,683 | B1 * | 11/2003 | Drumm et al. .............. 709/203 |
| 6,704,926 | B1 | 3/2004 | Blandy et al. |
| 6,718,540 | B1 * | 4/2004 | Azua et al. .................. 717/148 |
| 6,742,165 | B2 | 5/2004 | Lev et al. |
| 6,745,386 | B1 | 6/2004 | Yellin |
| 6,772,408 | B1 * | 8/2004 | Velonis et al. .............. 717/100 |
| 6,832,263 | B2 * | 12/2004 | Polizzi et al. ................ 709/246 |
| 6,836,889 | B1 | 12/2004 | Chan et al. |
| 6,842,897 | B1 | 1/2005 | Beadle et al. |
| 6,865,732 | B1 * | 3/2005 | Morgan ....................... 717/140 |
| 6,976,248 | B2 * | 12/2005 | Balassanian ................. 717/148 |
| 7,127,700 | B2 * | 10/2006 | Large .......................... 717/100 |
| 7,136,896 | B1 * | 11/2006 | Srinivas et al. .............. 709/203 |
| 7,346,655 | B2 * | 3/2008 | Donoho et al. .............. 709/204 |
| 7,493,591 | B2 * | 2/2009 | Charisius et al. ............ 717/100 |
| 7,519,684 | B2 * | 4/2009 | Backhouse et al. .......... 709/218 |
| 7,530,050 | B2 * | 5/2009 | Mohan et al. ................ 717/100 |
| 7,562,346 | B2 * | 7/2009 | Jhanwar et al. .............. 717/120 |

OTHER PUBLICATIONS

Ahern et al, "Formalising Java RMI with explict code mobility", ACM OOPSLA, pp. 403-422, 2005.*

Olshefski et al, "Understandiing the management of client perceived response time", ACM SIGMetrics, pp. 240-251, 2006.*

Mukhtar et al, "A Client Side Measurement Scheme for Request Routing in Virtual Open Content Delivery Networks", IEEE, pp. 235-242, 2003.*

* cited by examiner

Request Data Type

| Tag | Value |
|---|---|
| Applet-URL | (String) specifies the name of the requested applet |
| Code-Type | (Source/Intermediate/Binary) specifies the format the applet is to be delivered to the requesting client in. A request for binary would specify the CPU of the requesting client (e.g., x86) |
| Verification-Level | (0-100) specifies the degree of verification to be performed. 0 = no/minimal verification, 100 = maximum verification (highest level of security). |
| Optimization-Level | (0-100) specifies the degree of optimization to be performed. 0 = no/minimal optimization, 100 = maximum optimization. |

*Fig. 2A*

Code Data Type

| Tag | Value |
|---|---|
| Applet-URL | (String) specifies the name of the requested applet |
| Code-Type | (Source/Intermediate/Binary) specifies the format the applet is to be delivered to the requesting client in. A request for binary would specify the CPU of the requesting client (e.g., x86) |
| Verification-Level | (0-100) specifies the degree of verification to be performed. 0 = no/minimal verification, 100 = maximum verification (highest level of security). |
| Optimization-Level | (0-100) specifies the degree of optimization to be performed. 0 = no/minimal optimization, 100 = maximum optimization. |
| Applet Length | (0-$2^{32}$) specifies the size of the requested applet. |
| Applet Code | The Requested Applet in the form specified by the request data type. |

*Fig. 2B*

APPLICATION SERVER

This is a continuation of prior application Ser. No. 09/968,704, filed on Oct. 1, 2001, now U.S. Pat. No. 6,976,248 now allowed, which is a continuation of prior application Ser. No. 09/040,972, filed on Mar. 18, 1998, now U.S. Pat. No. 6,324,685, which is hereby incorporated by reference.

FIELD OF THE INVENTION

The present invention relates to computer operating system and, in particular, to a server architecture providing application caching and security verification.

BACKGROUND OF THE INVENTION

The growth of the Internet's importance to business, along with the increased dependence upon corporate networks, has created a demand for more secure and efficient computer systems. The traditional solution to this problem has been to depend upon improvements in hardware performance to make up for the performance penalty that is typically incurred when a computer system is made more secure and stable. Increased interconnectivity has also created a need for improved interoperability amongst a variety of computers that are now connected to one another. One solution to the problem of the variety of computers interconnected via the Internet and corporate networks has been the development of portable architecture neutral programming languages. The most widely known of these is Java, though, there are numerous other architecture neutral languages.

Architecture neutral programming languages allow programs downloaded from a server computer to a client computer to be interpreted and executed locally. This is possible because the compiler generates partially compiled intermediate byte-code, rather than fully compiled native machine code. In order to run a program, the client machine uses an interpreter to execute the compiled byte-code. The byte-codes provide an architecture neutral object file format, which allows the code to be transported to multiple platforms. This allows the program to be run on any system which implements the appropriate interpreter and run-time system. Collectively, the interpreter and runtime system implement a virtual machine. This structure results in a very secure language.

The security of this system is premised on the ability of the byte-code to be verified independently by the client computer. Using Java or some other virtual machine implementing technology, a client can ensure that the downloaded program will not crash the user's computer or perform operations for which it does not have permission.

The traditional implementations of architecture neutral languages are not without problems. While providing tremendous cross platform support, the current implementations of architecture neutral languages require that every client performs its own verification and interpretation of the intermediate code. The high computation and memory requirements of a verifier, compiler and interpreter restrict the applicability of these technologies to powerful client computers.

Another problem with performing the verification process on the client computer is that any individual within an organization may disable some or all of the checks performed on downloaded code. The current structure of these systems makes security management at the enterprise level almost impossible. Since upgrades of security checking software must be made on every client computer, the cost and time involved in doing such upgrades makes it likely that outdated or corrupt copies of the verifier or interpreter exist within an organization. Even when an organization is diligent in maintaining a client based security model, the size of the undertaking in a large organization increases the likelihood that there will be problems.

There is a need for a scalable distributed system architecture that provides a mechanism for client computers to request and execute applets in a safe manner without requiring the client machines to have local resources to compile or verify the code. There is a further need for a system in which the applets may be cached in either an intermediate architecture neutral form or machine specific form in order to increase overall system performance and efficiency.

SUMMARY OF THE INVENTION

In accordance with one embodiment of the invention, an applet server architecture is taught which allows client computers to request and execute applets in a safe manner without requiring the client to have local resources to verify or compile the applet code. Compilation and byte-code verification in the present invention are server based and thereby provide more efficient use of resources and a flexible mechanism for instituting enterprise-wide security policies. The server architecture also provides a cache for applets, allowing clients to receive applet code without having to access nodes outside the local network. The cache also provides a mechanism for avoiding repeated verification and compilation of previously requested applet code since any client requesting a given applet will have the request satisfied by a single cache entry.

Machine specific binary code is essentially interpreted code since the processor for a given computer can essentially be viewed as a form of an interpreter, interpreting binary code into the associated electronic equivalents. The present invention adds a level of indirection in the form of an intermediate language that is processor independent. The intermediate language serves as the basis for security verification, code optimizations, or any other compile time modifications that might be necessary. The intermediate form allows a single version of the source to be stored for many target platforms instead of having a different binary for each potential target computer. Compilations to the target form can either be done at the time of a cache hit or they can be avoided all together if the target machine is able to directly interpret the intermediate form. If the compilation is done on the server, then a copy of the of the compiled code as well as the intermediate form can be stored in the cache. The performance advantage derived from caching the compiled form as well as the intermediate depends upon the number of clients with the same CPU.

The novel features believed characteristic of the invention are set forth in the appended claims. The invention itself, however, as well as other features and advantages thereof will best be understood by reference to the detailed description which follows, when read in conjunction with the accompanying drawings.

BRIEF DESCRIPTION OF THE DRAWINGS

FIG. 2a is a table which illustrates the structure of the request format data type;

FIG. 2b is a table which illustrates the structure of the returned code data type.

DETAILED DESCRIPTION OF THE INVENTION

Figure 1:
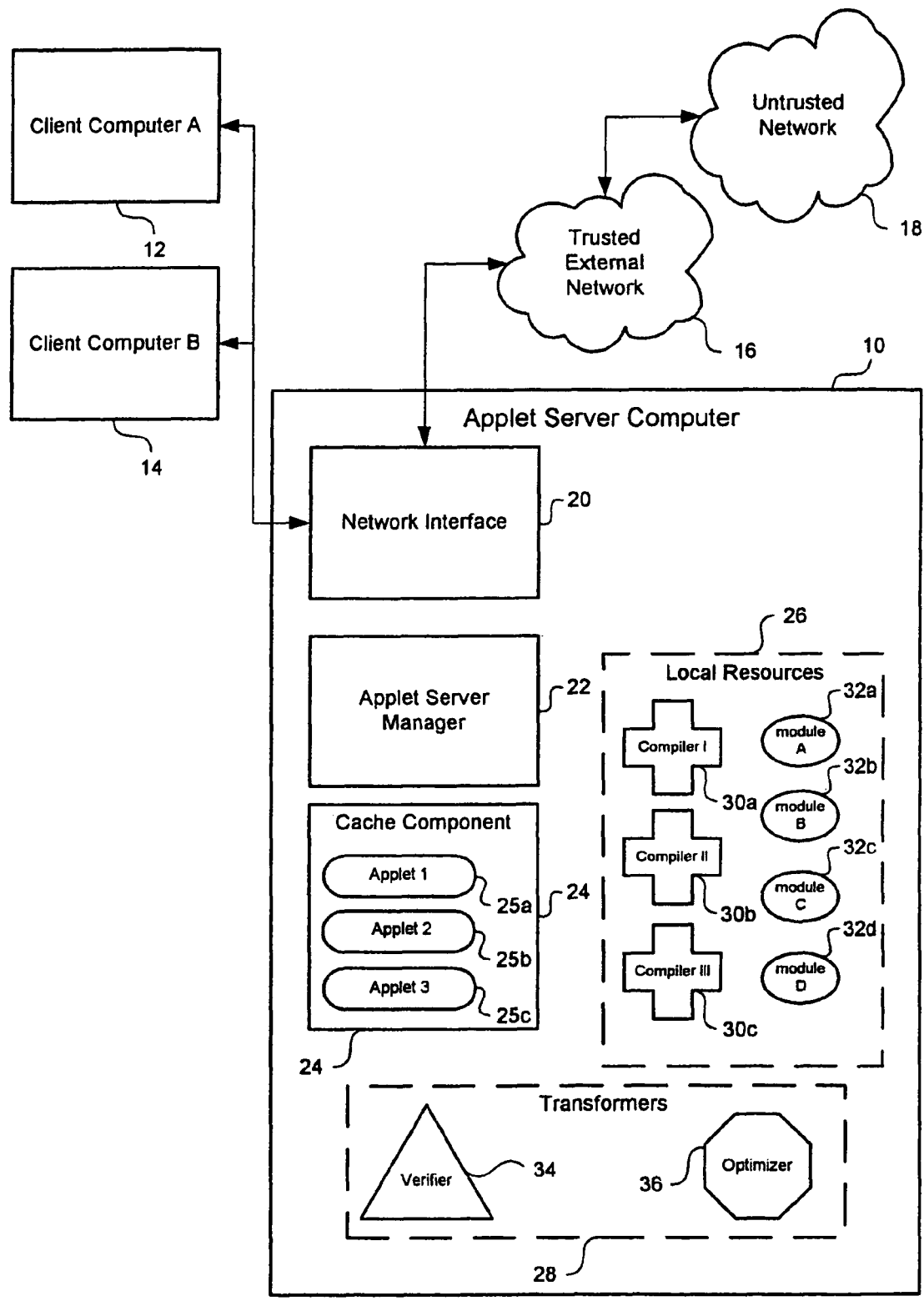
FIG. 1 is diagram showing the major components which may be used to implement an applet server in one embodiment of the present invention.

Referring to FIG. 1, an applet server architecture according to one embodiment of the invention is based on an applet server computer 10 which in turn is connected to client computer A 12, client computer B 14, an external network 16 and an untrusted network 18. The applet server computer 10 connects to client computers 12 and 14, an external network 16, and an untrusted network 18 by means of a network interface 20. Typically this connection will involve one or more of the computers or networks having a connection to the Internet.

The applet server computer 10 accomplishes its objectives by manipulating computer programs in several formats. An applet (e.g. applets 1-3, 25a-25c) is any form of program instructions, whether in binary, source or intermediate format. In the case of this architecture, the applet code can either be a self contained program, or it can be a code fragment associated with a larger application.

Binary format refers to processor specific machine instructions suitable for running natively on a given computing platform (also referred to as "target" because of the concept of "targeting" a compiler to produce binary code for a given processor type).

Source refers to non-binary applet code, generally in the form of higher level languages (i.e. C, C++, Java, Visual Basic, ActiveX, Fortran, and Modula).

Intermediate format refers to a common intermediate byte-code that is produced by compiling a given source code input. The intermediate byte-code need not necessarily be Java byte-code.

Treating applets in this general sense allows client computers 12 and 14 to request not only applications, but portions of applications. Client computers 12 and 14 are thus able to use applet server computer 10 as the equivalent of a loader, loading in appropriate parts of the application in the form of applets. In turn client computers 12 and 14 can run large applications without requiring that the client computers 12 and 14 have the resources to store the entire application in memory at once.

Having the applets delivered from applet server computer 10 allows code in intermediate form to be verified, optimized, and compiled before being transmitted to client computers 12 and 14. This reduces the amount of work the client computers 12 and 14 have to do and provides a convenient way to impose global restrictions on code.

In operation, client computer A 12 transmits a request to an applet server computer 10 requesting an applet in a particular form. The form may be selected from a large matrix of many possible forms that can be recognized by the system. The request specifies the format (source, intermediate, or binary) in which the client wishes to receive the applet. The request may also specify that the applet be verified or have some other transformation operation preformed upon it. Verification, optimization and compression are examples of types of transformation operations. The request is received by the network interface 20 of the applet server computer 10 which passes the request onto the applet server manager 22.

After interpreting the request, the applet server manager 22 checks to see if the requested applet is available in the cache 24. The cache 24 stores applets in a variety of formats (source, intermediate, or binary). If the requested form of the applet is available in the cache 24 (applet 1 25a, applet 2 25b, or applet 3 25c in this example) the applet server manager 22 instructs the network interface 20 to transmit the applet to requesting client computer A 12.

If the requested applet is not available in the cache 24, then the applet server manager 22 will attempt to build the requested applet from local resources 26 and one or more transformation operations performed by one or more of the transformers 28. Local resources 26 are comprised of compilers 30a, 30b and 30c and program code modules 32a, 32b, 32c and 32d. The requested applet is built by selecting one or more program code modules 32 and compiling them with one or more compilers 30. Transformer operations may be performed by the verifier 34 or the optimizer 36. After the applet server manager 22 builds the applet, the network interface 20 transmits the applet to the requesting client computer A 12.

If the request can not be satisfied by building the applet from local resources 26 and transformers 28, the applet server manager 22 will pass a request for the requested applet to external network 16 and/or untrusted network 18. The applet server manager 22 may request the applet in intermediate form or in executable form or it may request the local resources 26 and transformers 28 it needs to complete building the applet itself.

The cache 24 is capable of responding to the following commands: GET, PUT, and FLUSH. GET is used to retrieve a given applet from the cache. PUT is used to store an applet in the cache. FLUSH is used to clear the cache of one or more entries. When the cache is unable to locate an item in response to a GET operation, it returns a cache miss. The program which issued the GET command is then responsible for locating the desired form of the applet by other means and optionally storing it in the cache when it is retrieved (using the PUT operation). The FLUSH command will clear the cache of one or more entries and any subsequent GETs for the FLUSHed applet code will result in a cache miss. This is useful if a particular applet needs to be updated from a remote server on a periodic basis. When using PUT, the program issuing the command specifies a time to live (TTL) in the cache. When the TTL expires, the cache entry is removed by means of a FLUSH operation.

Local resources 26 are comprised of program modules 32 (applets in source form, not the requested form) and compilers 30. The program modules 32 are run through the compilers 30 in order to produce applets in the requested form. The applet server manager 20 may also direct the modules 32 to be processed by a verifier 34 or another transformer such as an optimizer 36. Program modules 32 are program code used to build applets. Program modules 32 may be stored in local resources 26 in source binary, or intermediate formats. When an applet is built it may require the operation of one or more compilers 30 upon one or more program modules 32. The program modules 32 may be combined and recompiled with previously cached applets and the resulting applet may be also cached for use at a future time. Additionally, program modules 32, compilers 30 and transformers 28 (including verifiers 34 and optimizers 36) may be distributed across a network. The applet server manager 22 may pass requests for the components it needs to build a particular applet back to the network interface 20 which in turn passes the request onto the rest of the network and may include external network 16 and untrusted network 18.

Figure 3:
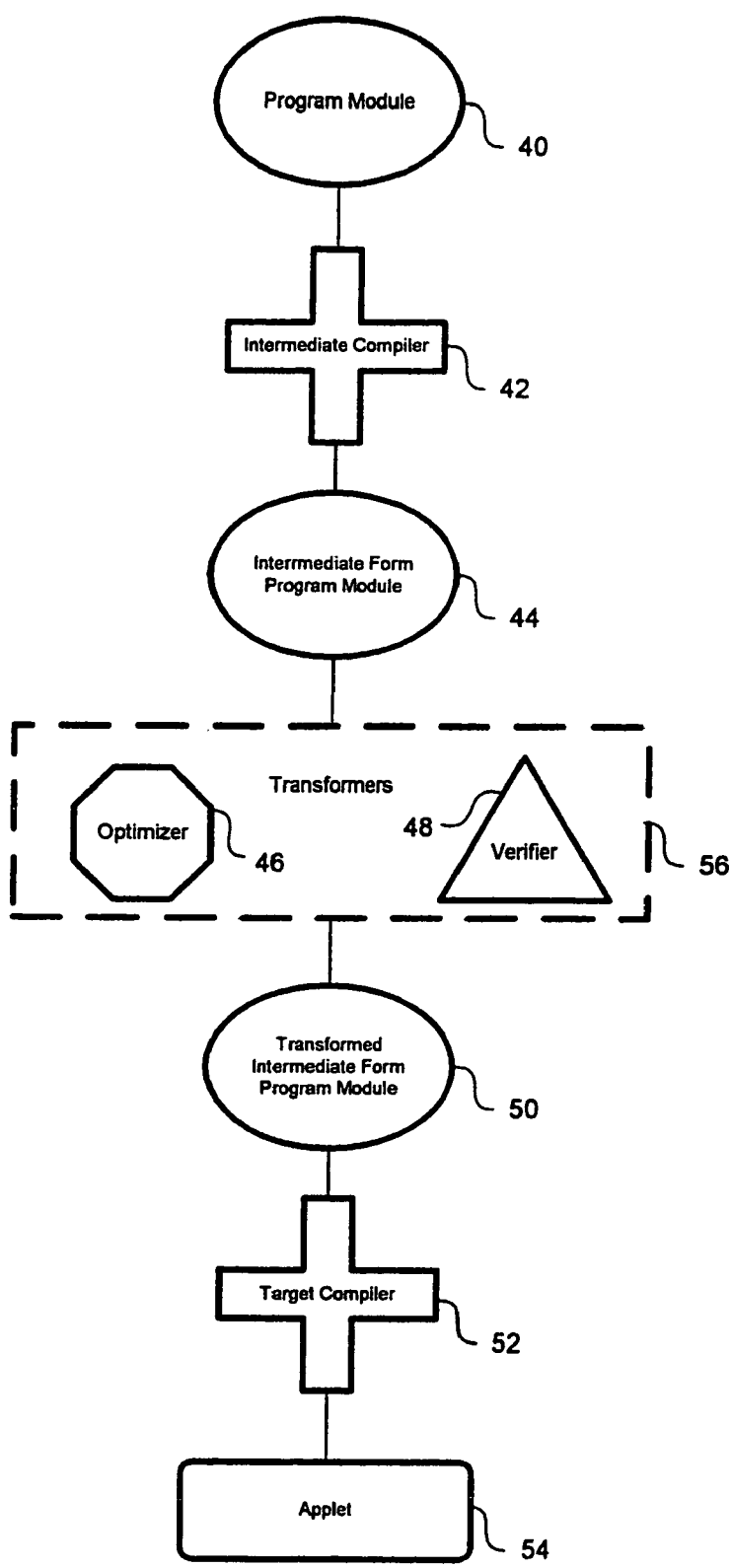
FIG. 3 is a diagram showing the compilation and transformation of a program module into an applet in a particular form.

FIG. 3 provides further illustration of how an applet is produced from local resources and transformers. In this illustration the request is for an optimized and verified applet compiled to a machine specific form. A program module 40 is compiled into an intermediate form program module 44 by an intermediate compiler 42. The intermediate form program module 44 is then transformed by an optimizer 46 or a verifier 48. The resulting transformed intermediate form program module 50 is then compiled by target compiler 52 into machine specific code applet 54.

There are two types of compilers used to build applets: intermediate compilers 42 and target compilers 52. The intermediate compiler 42 compiles program modules (source applet code) 40 and produces a common intermediate pseudo-binary representation of the source applet code (intermediate form program module 44). The word pseudo is used because the intermediate form 44 is not processor specific but is still a binary representation of the source program module 40. This intermediate form can be re-targeted and compiled for a particular processor. Alternatively, the intermediate form 44 can be interpreted by an interpreter or virtual machine that understands the internal binary representation of the intermediate form. A target compiler 52 compiles intermediate applet code 44 into an applet 54 in a processor specific format (binary) suitable for running natively on a given computing platform.

Transformers 56 are programs that take in intermediate code and put out intermediate code. Transformers 56 are generally used for things like verification and optimization. Other transformers might included compressors that identify portions of code that can be replaced with smaller equivalents. Transformers can be matched up to any other component that takes in intermediate code as an input. These include the cache 24 and the target compilers 52. Global policies for transformers 56 can be implemented which ensure that all applets are run through some set of transformers before being returned to the client.

A verifier 48 is a type of transformer that is able to analyze input code and determine areas that might not be safe. The verifier 48 can determine the level of safety. Some verifiers 48 look for areas where unsafe or protected memory is being accessed, others might look for accesses to system resources such as 10 devices. Once a verifier 48 determines the portion of unsafe applet code several steps can be taken. The offending code portion can be encased with new code that specifically prevents this unsafe code section from being executed. The unsafe code can be modified to be safe. The unsafe code can be flagged in such a way that a user can be warned about the possible risks of executing the code fragment. The verifier's role can therefore be summarized as determining where unsafe code exists and possibly altering the offending code to render it harmless. Verifiers 48 can operate on any format of input code, whether in source, intermediate or binary form. However, since intermediate code is a common format, it is most efficient to have a single verifier that will operate on code in this format. This eliminates the need to build specific knowledge of various source languages into the verifier. Verifiers 48 are a form of a transformer. Verifiers 48 take in intermediate code and put out verified intermediate code. Verifiers 48 are responsible for identifying non-secure portions of code in the intermediate code and modifying this code to make it secure. Security problems generally include access to memory areas that are unsafe (such as system memory, or memory outside the application space of the applet).

The choice of adding in the verification step can be left up to the client computer 12, the applet server computer 10 (see FIG. 1), or can be based on the network that the applet originated from. Server managers can institute global policies that affect all clients by forcing all applets to be run through the verifier 48. Alternatively, verification can be reserved for un-trusted networks (18 in FIG. 1), or it can be left up to the client to determine whether the verification should be performed. In the preferred embodiment, verification level is determined by the applet server 10. In this way, a uniform security policy may be implemented from a single machine (i.e., the applet server 10).

Optimizers 46 are another type of transformer program. Optimizers 46 analyze code, making improvements to well known code fragments by substituting in optimized but equivalent code fragments. Optimizers 46 take in intermediate code 44 and put out transformed intermediate code 50. The transformed intermediate code 50 is functionally equivalent to the source intermediate code 44 in that they share the same structure.

Referring again to FIG. 1, policies may be instituted on the applet server 10 that force a certain set of request parameters regardless of what the client asked for. For example, the applet server manager 22 can run the applet through a verifier 34 or optimizer 36 regardless of whether the client 12 requested this or not. Since the server 10 might have to go to an untrusted network 18 to retrieve a given applet, it will then run this applet through the required transformers 28, particularly the verifier 34 before returning it to the client 12. Since clients 12 and 14 have to go through the applet server computer 10, this ensures that clients 12 and 14 do not receive applets directly from an untrusted network 18. In addition, since the server will be dealing directly with untrusted network 18, it can be set up to institute policies based on the network. A trusted external network 16 may be treated differently than an untrusted network 18. This will provide the ability to run a verifier 34 only when dealing with an untrusted network 18, but not when dealing with a trusted external network 16. In one embodiment, all intermediate code is passed through a verifier 34 and the source of the code merely determines the level of verification applied.

The client 12 is the target computer on which the user wishes to execute an applet. The client 12 requests applets from the server 10 in a specific form. Applets can be requested in various formats including source, intermediate and binary. In addition, an applet can be requested with verification and/or other compile time operations. Optionally, the client 12 can pass a verifier to the server to provide verification. If the server 10 implements its own security, then both the client and server verifiers will be run. The verifier that is passed from the client to the server is cached at the server for subsequent verification. The client can refer to this verifier by a server-generated handle to avoid having to pass the verifier each time an applet is requested.

Client computers 12 and 14 requesting applet code in intermediate format need to have an interpreter or virtual machine capable of interpreting the binary code in the intermediate format if the applet is to be executed on the client machine.

In the preferred embodiment, requests to the applet server are in a format similar to those of an HTTP header and are comprised of tags and values. In one embodiment, an HTTP GET method is used to make the request (though use of the HTTP protocol is not necessary to implement the present invention). The request is made up of a series of tags which specify the requested applet, the platform on which it is to be run and the type of code (source/intermediate/binary), a verification level and an optimization level. New tags and values can be added to extend functionality as needed and the applet server manager 22 will discard any tag it does not recognize. When the applet server computer 10 returns the requested applet to the requesting client computer A 12, it will transmit the request header followed by the applet code. In this instance, the header will additionally include a field which defines the length of the applet code. FIG. 2 provides a table which illustrates the request format and the returned code format.

While this invention has been described with reference to specific embodiments, this description is not meant to limit the scope of the invention. Various modifications of the disclosed embodiments, as well as other embodiments of the invention, will be apparent to persons skilled in the art upon reference to this description. It is therefore contemplated that the appended claims will cover any such modifications or embodiments as fall within the scope of the invention.

I claim:

1. A method operating on a computer system, having a client computer and a server computer, for managing requests to the server computer, the method comprising:
at the server computer, receiving a request from the client computer, the request identifying an application and identifying a form of the application, the identified form being one of a plurality of available forms; and
in response to receiving the request:
generating the identified form of the application from a source form of the application, wherein generating comprises:
compiling the source form of the application into a compiled form of the application; and
transforming the application into a transformed form of the application, wherein transforming comprises compression of the compiled form of the application; and
sending the transformed form of the application to the client computer.

2. The method of claim 1 wherein the identified form of the application is specified using a Universal Resource Locator.

3. The method of claim 1 wherein the identified form of the application is specified using a cookie.

4. The method of claim 1 wherein the identified form of the application is specified in an HTTP header.

5. The method of claim 1 wherein the transformed form of the application is a web page.

6. The method of claim 1 wherein the transformed form of the application is a portion of a web page.

7. The method of claim 1 wherein transforming further comprises execution of the generated form.

8. The method of claim 1 wherein transforming further comprises verification of the generated form.

9. The method of claim 1 wherein transforming further comprises optimization of the generated form.

10. The method of claim 1 wherein the transformed form of the application is sent to the client computer in an HTTP response.

11. A method operating on a computer system, having a client computer and a server computer, for managing requests to the server computer, the method comprising:
at the server computer, receiving a request from the client computer, the request identifying an application and identifying a form of the application; and
in response to receiving the request:
compiling the application into a compiled form;
transforming the compiled application into a transformed form of the compiled form of the application, wherein transforming comprises execution and compression of the compiled form; and
sending the transformed form of the application to the client computer.

12. The method of claim 11 wherein the identified form of the application is specified using a Universal Resource Locator.

13. The method of claim 11 wherein the identified form of the application is specified using a cookie.

14. The method of claim 11 wherein the identified form of the application is specified in a HTTP header.

15. The method of claim 11 wherein the identified form of the application is a web page.

16. The method of claim 11 Wherein the identified form of the application is a portion of a web page.

17. The method of claim 11 wherein transforming further comprises verification of the compiled form.

18. The method of claim 11 wherein transforming further comprises optimization of the compiled form.

19. The method of claim 11 wherein the transformed form of the application is sent to the client computer in an HTTP response.

20. The method of claim 11, further comprising:
storing a plurality of available forms of the application;
the server, in response to receiving the request, determining if the identified form of the application is one of the stored plurality of available forms of the application; and
if the identified form of the application is one of the stored plurality of available forms, sending the identified form of the application to the client computer without compiling and transforming.

21. The method of claim 11, further comprising:
storing a plurality of available forms of the application;
the server, in response to receiving the request, determining if the identified form of the application is one of the stored plurality of available forms of the application; and
if the identified form of the application is one of the stored plurality of available forms, sending the identified form of the application to the client computer without compiling.

22. A method operating on a computer system, having a client computer and a server computer, for generating an application in response to a request by the client computer wherein each request for an application specifies one form of the application out of a plurality of forms of the application, comprising;
receiving on the server computer a request from the client computer for an application in a specified form from a plurality of available forms;
compiling and compressing the application to thereby generate the specified form; and
transmitting the generated application in the specified form to the client computer.

23. The method of claim 22 wherein the specified form of the application is specified using a Universal Resource Locator.

24. The method of claim 22 wherein the specified form of the application is specified using a cookie.

25. The method of claim 22 wherein the specified form of the application is specified in a HTTP header.

26. The method of claim 22 wherein the specified form of the application requested is a web page.

27. The method of claim 22 wherein the specified form of the application requested is a portion of a web page.

28. The method of claim 22 wherein the specified form of the application is transmitted to the client computer in an HTTP response.

29. The method of claim 22 wherein the specified form of the application is sent to the client computer in an HTTP Response.

30. A method operating on a computer system, having a client computer and a server computer, for managing requests to the server computer, the method comprising:
receiving a request from the client computer, the request identifying an application and identifying a form of the application; and
the server computer, in response to receiving the request:
compiling a form of the application;
caching the compiled form of the application;

transforming the compiled form of the application to thereby generate the identified form of the application, wherein transforming comprises compression of the compiled form; and sending the identified form of the application to the client computer.

31. The method of claim 30 wherein transforming further comprises execution of the compiled form.

32. The method of claim 30 wherein transforming further comprises verification of the compiled form.

33. The method of claim 30 wherein transforming further comprises optimization of the compiled form.

34. The method of claim 30 wherein caching the compiled form of the application comprises storing the compiled form of the application in local memory.

35. A method operating on a computer system, having a client computer and a server computer, for managing requests to the server computer, the method comprising:

at the server computer, receiving a request from the client computer, the request identifying an application and identifying a form of the application; and in response to receiving the request:
generating the identified form of the application from a source form of the application, wherein generating comprises:
compiling the application from the source form into a compiled form;
transforming the application into a transformed form of the compiled form of the application, wherein transforming comprises compression of the compiled form; and
sending the transformed form of the application to the client computer.

36. the method of claim 35, further comprising:
storing a plurality of available forms of the application;
the server, in response to receiving the request, determining if the identified form of the application is one of the stored plurality of available forms of the application; and
if the identified form of the application is one of the stored plurality of available forms, sending the identified form of the application to the client computer without generating and transforming.

37. The method of claim 35, further comprising:
storing a plurality of available forms of the application;
the server, in response to receiving the request, determining if the identified form of the application is one of the stored plurality of available forms of the application; and
if the identified form of the application is one of the stored plurality of available forms, sending the identified form of the application to the client computer without generating.

38. A method operating on a computer system, having a client computer and a server computer, for managing requests to the server computer, the method comprising:

receiving a request from the client computer, the request identifying an application and identifying a form of the application; and the server computer, in response to receiving the request:
compiling a source form of the application;
caching the compiled form of the application;
transforming the compiled form of the application to thereby generate the identified form of the application, wherein transforming comprises compression of the compiled form;
sending the identified form of the application to the client computer; and
caching the identified form of the application.

39. A method operating on a computer system, having a client computer and a server computer, for managing requests to the server computer, the method comprising:

receiving a request from the client computer, the request identifying an application and identifying a form of the application; and the server computer, in response to receiving the request:
compiling a source form of the application;
caching the compiled form of the application;
transforming the compiled form of the application to thereby generate the identified form of the application, wherein transforming the compiled form comprises compression of the compiled form; and
sending the identified form of the application to the client computer.

40. A method operating on a computer system, having a client computer and a server computer, for managing requests to the server computer, the method comprising:

receiving a request from the client computer, the request identifying an application and identifying a form of the application; and the server computer, in response to receiving the request:
compiling a source form of the application;
transforming the compiled form of the application to thereby generate the identified form of the application, wherein transforming comprises compression of the compiled form;
sending the identified form of the application to the client computer; and
caching the identified form of the application.

* * * * *